(12) United States Patent
Miller et al.

(10) Patent No.: US 6,556,555 B1
(45) Date of Patent: Apr. 29, 2003

(54) METHOD FOR CALCULATING THE PN GENERATOR MASK TO OBTAIN A DESIRED SHIFT OF THE PN CODE

(75) Inventors: Leonard E. Miller, Kensington; Jhong Sam Lee, Potomac, both of MD (US)

(73) Assignee: J.S. Lee Associates, Inc., Rockville, MD (US)

( * ) Notice: Subject to any disclaimer, the term of this patent is extended or adjusted under 35 U.S.C. 154(b) by 0 days.

(21) Appl. No.: 09/395,159

(22) Filed: Sep. 14, 1999

Related U.S. Application Data
(60) Provisional application No. 60/101,376, filed on Sep. 22, 1998.

(51) Int. Cl.[7] .............................................. H04J 13/02
(52) U.S. Cl. ....................................... 370/335; 370/203
(58) Field of Search ................................ 370/203, 320, 370/335, 342, 441, 479; 375/130

(56) References Cited

U.S. PATENT DOCUMENTS

| | | |
|---|---|---|
| 4,460,992 A | 7/1984 | Gutleber et al. |
| 5,034,906 A | 7/1991 | Chang et al. |
| 5,103,459 A | 4/1992 | Gilhousen et al. |
| 5,228,054 A | 7/1993 | Rueth et al. |
| 5,416,797 A | 5/1995 | Gilhousen et al. |
| 5,519,736 A | 5/1996 | Ishida |
| 5,532,695 A | 7/1996 | Park et al. |
| 5,737,329 A | 4/1998 | Horiguchi |
| 5,926,070 A * | 7/1999 | Barron et al. ................. 331/78 |
| 6,005,888 A * | 12/1999 | Barron ........................ 375/208 |
| 6,246,676 B1 * | 6/2001 | Chen et al. .................. 370/342 |

OTHER PUBLICATIONS

J. S. Lee and L. E. Miller, *CDMA Systems Engineering Handbook* (Artech House 1998; Ch. 6).

W. A. Davis, "Automatic delay changing facility for delayed m-sequences," *Proceedings of the IEEE*, vol. 54, pp 913–914, Jun. 1996.

* cited by examiner

*Primary Examiner*—Douglas Olms
*Assistant Examiner*—Ken Vanderpuye
(74) *Attorney, Agent, or Firm*—Banner & Witcoff, Ltd.

(57) ABSTRACT

A method and program for determining the PN generator mask which is required to obtain a specific shift of the PN sequence at the output of a phase shift network (PSN), relative to the reference sequence that is represented by the inverse of the characteristic polynomial of the PN sequence. The method applies for any initial loading (state) of the PN generator, which can be either the simple shift register generator (SSRG) type or the modular shift register generator (MSRG) type of linear feedback shift register (LFSR). The application of the present invention includes, but is not limited to, any code division multiple access (CDMA) cellular telephone system which requires a method for generating specific shifts of a given reference PN sequence for each base station and each mobile station in the network.

6 Claims, 11 Drawing Sheets

| Time | SSRG State | PSN Output | | Time | SSRG State | PSN Output |
|---|---|---|---|---|---|---|
| 0 | 1000 | 1 | | 0 | 1001 | 1 |
| 1 | 1100 | 0 | | 1 | 0100 | 0 |
| 2 | 1110 | 1 | | 2 | 0010 | 1 |
| 3 | 1111 ↓ reference | 1 | | 3 | 0001 | 1 |
| 4 | 0111 | 0 | | 4 | 1000 | 0 |
| 5 | 1011 | 0 | | 5 | 1100 | 0 |
| 6 | 0101 | 1 | | 6 | 1110 | 1 |
| 7 | 1010 | 0 | | 7 | 1111 ↓ reference | 0 |
| 8 | 1101 | 0 | | 8 | 0111 | 0 |
| 9 | 0110 | 0 | | 9 | 1011 | 0 |
| 10 | 0011 | 1 ↓ reference | | 10 | 0101 | 1 ↓ reference |
| 11 | 1001 | 1 | | 11 | 1010 | 1 |
| 12 | 0100 | 1 | | 12 | 1101 | 1 |
| 13 | 0010 | 1 | | 13 | 0110 | 1 |
| 14 | 0001 | 0 | | 14 | 0011 | 0 |

| Time | MSRG State | PSN Output | | Time | MSRG State | PSN Output |
|---|---|---|---|---|---|---|
| 0 | 1000 | 1 | | 0 | 1001 | 1 |
| 1 | 0100 | 0 | | 1 | 1100 | 0 |
| 2 | 0010 | 1 | | 2 | 1111 | 1 |
| 3 | 0001 ↓ reference | 1 | | 3 | 1110 | 1 |
| 4 | 1001 | 0 | | 4 | 0111 | 0 |
| 5 | 1101 | 0 | | 5 | 1010 | 0 |
| 6 | 1111 | 1 | | 6 | 0101 | 1 |
| 7 | 1110 | 0 | | 7 | 1011 | 0 |
| 8 | 0111 | 0 | | 8 | 1100 | 0 |
| 9 | 1010 | 0 | | 9 | 0110 | 0 |
| 10 | 0101 | 1 ↓ reference | | 10 | 0011 | 1 ↓ reference |
| 11 | 1011 | 1 | | 11 | 1000 | 1 |
| 12 | 1100 | 1 | | 12 | 0100 | 1 |
| 13 | 0110 | 1 | | 13 | 0010 | 1 |
| 14 | 0011 | 0 | | 14 | 0001 ↓ reference | 0 |

METHOD FOR CALCULATING THE PN GENERATOR MASK TO OBTAIN A DESIRED SHIFT OF THE PN CODE

The present application is being filed under the provisions of 37 C.F.R. §1.53(b), having claimed the benefit of provisional application No. 60/101,376, filed on Sep. 22, 1998.

BACKGROUND OF THE INVENTION

In a code division multiple access (CDMA) cellular telephone system, the different forward and reverse link transmitter waveforms are modulated by unique pseudorandom noise (PN) code sequences that provide identification of the base stations for the forward link and identification of the mobile stations for the reverse link. The PN code sequence that is uniquely assigned to a transmitter (base station or mobile station) is a different phase shift (offset) of a reference sequence, as illustrated in FIG. 1 (numeral 100). In FIG. 1, each of the base stations (denoted as having offsets A, B, C, D, E, F, and G) transmits signals modulated by PN code 1 with a unique assigned offset, and each mobile station (denoted as having offsets a, b, c, . . . , q, r) transmits signals modulated by PN code 2 with a unique assigned offset. The present invention discloses a method of generating these unique assigned offsets of any PN code relative to a given reference sequence.

It is well known in the literature, as in *CDAM Systems Engineering Handbook*, that periodic binary PN sequences are generated using linear feedback shift registers (LFSRs). There are two basic LFSR configurations: the "simple shift register generator" (SSRG) and the "modular shift register generator" (MSRG). Diagrams of these two LFSR configurations for n-stage shift registers are shown as 201 and 301 in FIGS. 2 and 3, respectively, in which the coefficients $\{c_i, i=1, 2, \ldots, n-1\}$ assume, values 0 or 1 and indicate the feedback connections necessary for each configuration to produce at the output of the LFSR (203 or 303) some shift of the sequence described by the PN sequence-generating characteristic polynomial $$f(x)=1+c_1x+c_2x^2+c_3x^3+ \ldots +c_{n-1}x^{n-1}+x^n, \ c_i=0 \text{ or } 1 \quad (1a)$$

where, as described in the book *Shift Register Sequences*, the polynomial represents the recursion or the successive 0 or 1 valued outputs of the register, $\{a_k\}$, given by $$a_k=c_1a_{k-1}+c_2a_{k-2}+ \ldots +c_{n-1}a_{k-n+1}+a_{k-n}, \ c_i=0 \text{ or } 1 \quad (1b)$$

The output sequence from the LFSR can be denoted $a_0, a_1, a_2, \ldots$, and this sequence can be represented as a polynomial, $a(x)$, that is, $$a_0, a_1, a_2, \ldots \Leftrightarrow a(x)=a_0+a_1x+a_2x+ \ldots \quad (1c)$$

It is also described in *CDMA Systems Engineering Handbook*, that the power series for output sequence $a(x)$ is obtained by dividing a binary polynomial, $g(x)$, of degree less than n, by the characteristic polynomial, $f(x)$, of degree n:

$$a(x) = \frac{g(x)}{f(x)},$$

$$g(x)=g_0+g_1x+g_2x^2+ \ldots +g_{n-1}x^{n-1}, \ g_i=0 \text{ or } 1 \quad (1d)$$

Excluding the case of $g(x)=0$, there are $2^n-1$ possible numerator polynomials of degree less than n. For a PN sequence, which has period $P=2^n-1$, each of the possible numerator polynomials corresponds uniquely to one of the possible "phase shifts" for the periodic sequence, and each one corresponds uniquely to one of the nonzero initial loadings of the LFSR. The terms of the sequence $a(x)$ can be calculated by "long division," given $g(x)$. When the numerator polynomial is $g(x)=1$, the resulting sequence of $1/f(x)$ is the reference sequence for the PN code. The phase shifts of the PN sequence are measured with respect to this reference sequence.

For example, let the characteristic polynomial of a PN sequence be $f(x)=1+x+x^3$ and consider two cases of the numerator polynomial, $g(x)=1+x$ and $g(x)=1$. By long division for case of $g(x)=1+x$ we find that $$a(x) = \frac{1+x}{1+x+x^3} = 1+x^3+x^4+x^5+x^7+x^{10}+x^{11}+x^{12}\ldots \rightarrow \quad (1e)$$

$$(1,0,0,1,1,1,0),$$

$$(1,0,0,1,1,1,0),(1,1,1,0,1,0,0),$$

$$(1,0,\ldots),\ldots$$

in which the parentheses are used to indicate periods of the sequence having $P=2^n-1=7$ bits since $n=3$. For the case of $g(x)=1$, the long division becomes the reference sequence:

$$a(x) = \quad (1f)$$

$$\frac{1}{1+x+x^3} = 1+x+x^2+x^4+x^7+x^8+x^9+x^{11}\ldots \rightarrow$$

$$(1,1,1,0,1,0,0),(1,1,\ldots),\ldots$$

In this example, the sequence for numerator polynomial $g(x)=1+x$ is shifted three bits to the right compared to the reference sequence. The number of bits shifted is predicted from $g(x)$ when it is expressed as a power of x, reduced to a polynomial of degree less than n by the modular calculation, denoted "modulo $f(x)$" (or sometimes "mod $f(x)$" for short) given by $$g(x)=x^3 \text{ modulo } f(x)=x^3 \text{ modulo } (1+x+x^3)=1+x \quad (2a)$$

The power of x in the expression $x^3$ modulo $f(x)$ denotes the number of bits being shifted relative to the reference sequence of $1/f(x)$. It is now established that a given sequence can always be represented by either a power of x or by a polynomial.

The initial state of the shift register contents in FIGS. 2 and 3 is denoted by the vector $(R_1, R_2, \ldots, R_n)$, which is also represented as the polynomial $s_0(x)$, as follows:

$$(R_1, R_2, \ldots, R_n) \Leftrightarrow s_0(x)=R_1+R_2x+R_3x^2+ \ldots +R_nx^{n-1}, \ R_i=0 \text{ or}(1b)$$

Implied but not shown in FIGS. 2 and 3 are connections for various timing and control signals, such as the clock pulses that control the advancement of the LFSR's shift register.

Elements 202 and 302 of FIGS. 2 and 3 show the outputs of the shift register stages being selectively modulo-2 added in the phase shift networks (PSNs), with the selection determined by the "mask" vector $(m_0, m_1, \ldots, m_{n-1})$, where each component takes the values 0 or 1. As described in *Shift Register Sequences*, the bit-by-bit modulo-2 addition of two or more sequences that are different shifts of a PN sequence produces another shift of the sequence at the output of the PSN (204 or 304).

The prior art regarding PN code masks includes U.S. Pat. Nos. 4,460,992; 5,103,459; 5,416,797; and 5,737,329 which describe means which are disclosed for implementing CDMA communications systems in which transmissions to or from several mobile receivers are multiplexed using PN codes that are shifts of the same PN code sequence. In these patents, the shifts are obtained using masks. However, these patents do not describe how the masks are calculated. U.S. Pat. Nos. 5,228,054 and 5,532,695 describe means for making PN code masks work in conjunction with the lengthening of the sequence by insertion, but also do not indicate how the masks are calculated and implemented. In the system disclosed in U.S. Pat. No. 5,034,906, delayed PN sequences are obtained by timing techniques rather than masks. In the system disclosed in U.S. Pat. No. 5,519,736, a master PN sequence generated by an MSRG is modified by feed-forward circuits and stored masks to produce N modified versions of the master PN sequence for CDMA multiplexing, but the method for determining the masks and the feed-forward circuit connections is not disclosed.

The relationship between the sequence at the input of an SSRG and the sequence at the output of a PSN for a special LFSR loading was recognized in a paper by W. A. Davis, entitled "Automatic delay changing facility for delayed m-sequences" (*Proc. IEEE*, June 1966), which suggested using an MSRG to calculate the mask for the special case of the loading. Also, in the book *Direct Sequence Spread Spectrum Techniques*, it is noted that a particular mask causes the sequence at the output of the PSN to be delayed k bits from the sequence at the input of the SSRG for any sequence shift at the input.

Regarding the algebra of PN code masks, for both the SSRG and the MSRG implementations of a PN sequence, the particular phase of the sequence at the output of the shift register (taken from the last stage) can be changed by changing the initial loading (state) of the shift register, denoted as $s_0(x)$ in (2b). By the method disclosed in this invention, however, any desired shift of the sequence can also be obtained by combining certain outputs of the shift register stages, without changing $s_0(x)$. The particular shift register stages to be combined are specified by a mask vector $(m_0, m_1, \ldots, m_{n-1})$, which is also represented by a mask polynomial as $$m(x)=m_0+m_1x+ \ldots +m_{n-1}x^{n-1}, m_i=0 \text{ or } 1 \qquad (3).$$

Those output stages that are modulo-2 added at the PSN are specified by the nonzero mask vector components. This control is implemented in logic circuitry by AND gating each mask vector component with its corresponding shift register stage.

SUMMARY OF THE INVENTION

The present invention discloses a method and program for determining the PN generator mask which is required to obtain a specific shift of the PN sequence at the output of a phase shift network (PSN), relative to a reference sequence, for either a simple shift register generator (SSRG) or a modular shift register generator (MSRG) under any nonzero initial loading of the respective n-stage linear feedback shift register (LFSR).

By the method that is disclosed in this invention, the specific mask vector is found for any value of the initial loading of the LFSR, whether it is an SSRG or it is an MSRG, each type of LFSR requiring a different procedure.

For any nonzero initial loading of the LFSR, the output of the shift register will be some shift (for example, the qth shift) relative to the reference sequence $1/f(x)$, as illustrated in FIG. 4 (numeral 400). The algebra for describing such an output sequence is given by $a_q(x)=[x^q \text{ modulo } f(x)]/f(x)$. The present invention discloses the procedure to determine the vector of mask coefficients $(m_0, m_1, \ldots, m_{n-1})$ that produces the desired kth shift at the output of the PSN relative to the reference sequence $1/f(x)$. The method is stated first for the SSRG, then for the MSRG.

The mask polynomial, being a polynomial of degree less than n, can be written as a power of x modulo the characteristic polynomial, as established in (2a):

$$m(x)=m_0+m_1x+ \ldots +m_{n-1}x^{n-1}=x^r \text{ modulo } f(x) \qquad (4).$$

Assuming that the mask polynomial is $x^r$ modulo $f(x)$, and that the initial loading of the shift register is such that the SSRG output is $$a_q = (x) = \frac{g_q(x)}{f(x)} = \frac{x^q \bmod f(x)}{f(x)} \qquad (5)$$

then the output of the PSN, which is the kth sequence shift relative to the reference sequence, $1/f(x)$, is given by $$a_k(x) = \frac{x^k \bmod f(x)}{f(x)} = \frac{x^{q+r-n+1} \bmod f(x)}{f(x)} \qquad (6)$$

These SSRG and PSN outputs for any loading $(R_1, R_2, \ldots, R_n)$ are shown in FIG. 4, numeral 400. From (6), we have $$q+r-n+1=k \qquad (7a)$$

where, as shown in FIG. 4, q is the shift at the SSRG output and k is the desired shift at the PSN output, both relative the reference sequence. From (7a) the required mask polynomial parameter r for (4) is $$r=k-q+n-1 \qquad (7b).$$

Thus the general procedure for finding the SSRG mask required to generate the kth shift of the sequence at the PSN output is the following, based on a given initial loading, $s_0(x)$:

1. Find the value of q (the phase shift at the SSRG output). From (1d), the numerator polynomial $g_q(x)$ is determined from the initial state, from which q is found.
2. Calculate the SSRG mask polynomial from (4) and (7b).

Example (SSRG mask) Suppose that it is desired to generate the 10th shift of the sequence $1/f(x)$, for a 4-stage SSRG with $f(x)=1+x+x^4$ (k=10 and n=4) for two different initial loadings 1000 and 1001. The application of the general procedure for the initial loading 1000 takes the following steps:
1. For the initial loading 1000, the first four bits of the sequence are 0, 0, 0, 1. Thus from (1c) we have $a_q(x)=x^3+ \ldots$ and
   $g_q(x)$=terms of $a_q(x)f(x)$ with degree less than $4=x^3 \rightarrow q=3$.
2. From (7b), the parameter for the required mask polynomial is $r=k-q+n-1=r=10-3+4-1=10$. The mask polynomial is calculated as follows:

$$m(x) = x^r \text{modulo } f(x)$$
$$= [x^{10} \text{modulo } f(x)] = 1 + x + x^2$$

which gives the mask vector $(m_0, m_1, m_2, m_3)=(1, 1, 1, 0)$. This indicates that the first, second, and third stages of the SSRG are modulo-2 added at the PSN to give the required shift at the PSN output, as shown in FIG. 5, numeral 500.

The application of the general procedure for the case of the initial loading 1001 takes the following steps. This example will show that the same PSN output shift can be obtained for a different SSRG loading.

1. For the initial loading 1001, the first four bits of the sequence are 1, 0, 0, 1. Thus from (1c) we have $a_q(x) = 1+x^3+\ldots$ and $$g_q(x) = \text{terms of } a_q(x)f(x) \text{ with degree less than } 4$$
$$= 1 + x + x^3$$
$$= x^7 \text{ modulo } f(x), \text{ implying that } q = 7$$

2. From (7b), the parameter for the required mask polynomial is r=k−q+n−1=r=10−7+4−1=6. The mask polynomial is calculated as follows:

$$m(x) = x^r \text{modulo } f(x)$$
$$= [x^6 \text{modulo } f(x)] = x^2 + x^3$$

which gives the mask vector $(m_0, m_1, m_2, m_3) = (0, 0, 1, 1)$. This indicates that third and fourth stages of the SSRG are modulo-2 added at the PSN, to give the required shift at the PSN output, as shown in FIG. 5.

Having calculated the two SSRG mask—one for the initial loading of 1000 and one for the initial loading of 1001—we know which stages of the respective SSRGs to be combined (modulo-2 added) to obtain the desired sequence shifts at the respective PSN outputs. The SSRG and PSN outputs are compared for this example in FIG. 5, numeral 500, to observe how the mask formulas applied in these two situations have enabled us to produce the same shift (k=10) at the outputs of the PSNs (503 and 506), although the shifts at the outputs of the SSRGs (501 and 504) are different.

Now the MSRG shift register configuration is considered. For an MSRG, the mask polynomial, being of degree less than n, can be written as the polynomial representing the first n bits of some shift, r, of the sequence:

$$m(x) = m_0 + m_1 x + \ldots + m_{n-1} x^{n-1} = \left\{ \frac{x^r \bmod f(x)}{f(x)} \right\}_{deg < n} \quad (8)$$

It is assumed that the initial loading of the shift register is such that the MSRG output is $$a_q(x) = \frac{g_q(x)}{f(x)} = \frac{x^q \bmod f(x)}{f(x)} = \frac{s_0^*(x)}{f(x)} \quad (9)$$

where $s_0^*(x)$ is the reverse of the initial state polynomial. Then the output of the PSN, which is the kth sequence shift relative to the reference sequence, $1/f(x)$, is given by $$a_k(x) = \frac{x^k \bmod f(x)}{f(x)} = \frac{x^{q+r-n+1} \bmod f(x)}{f(x)}$$

These MSRG and PSN outputs for any loading $(R_1, R_2, \ldots, R_n)$ are shown in FIG. 6, numeral 600. From (10), it is seen that $$q+r-n+1=k \quad (11a)$$

where, as shown in FIG. 6, q is the shift at the MSRG output and k is the desired shift at the PSN output, both relative to the reference sequence. From (11a) the required mask polynomial parameter r for (8) is $$r=k-q+n-1 \quad (11b).$$

Thus the general procedure for finding the MSRG mask required to generate the kth shift of the sequence at the output of the PSN is the following, based on a given initial loading $s_0(x)$:

1. Find the value of q (the phase shift at the MSRG output). From (9), the numerator polynomial $g_q(x)$ is determined as the reverse of the initial state, from which q is found.
2. Calculate the MSRG mask polynomial from (8) and (11b).

As an example regarding the MSRG mask, it is supposed that it is desired to generate the 10th shift of the sequence $1/f(x)$, for a 4-stage MSRG with $f(x)=1+x+x^4$ (k=10 and n=4) for two different initial loadings, 1000 and 1001. The application of the general procedure for the initial loading 1000 takes the following steps:

1. For the initial loading 1000, the initial state polynomial is $s_0(x)=1$. From (9) the numerator polynomial $g_q(x)$ is the reverse of $s_0(x)$, or $g_q(x)=x^3$. Thus q=3.
2. From (11b), the parameter for the required mask polynomial is r=k−q+n−1=10−3+4−1=10. The MSRG mask polynomial is calculated as $$m(x) = \left\{ \frac{x^r \bmod f(x)}{f(x)} \right\}_{deg < n} = \left\{ \frac{x^{10} \bmod f(x)}{f(x)} \right\}_{deg < 4}$$

The modular calculation gives $$x^{10} \bmod (1+x+x^4) = 1+x+x^2$$

The mask polynomial that gives shift 10 at the PSN output for the loading 1000 is then calculated as $$m(x) = \left\{ \frac{1+x+x^2}{1+x+x^4} \right\}_{deg < 4} = 1 + x^2 + x^3$$

which gives the mask vector $(m_0, m_1, m_2, m_3) = (1, 0, 1, 1)$. This indicates that all but the second stage of the MSRG are modulo-2 added at the PSN to give the required shift at the PSN output, as shown in FIG. 7, numeral 700.

The application of the general procedure for the initial loading 1001 takes the following steps:

1. For the initial loading 1001, the initial state polynomial is $s_0(x)=1$. From (9) the numerator polynomial $g_q(x)$ the reverse of $s_0(x)$, or $g_q(x)=1+x^3=x^{14}$ modulo f(x), so that q=14.
2. From (11b), the mask parameter r=k−q+n−=10−14+4−1=−1+15=14, The required mask polynomial is calculated as $$m(x) = \left\{ \frac{x^{r \bmod P} \bmod f(x)}{f(x)} \right\}_{deg < n} = \left\{ \frac{x^{14} \bmod f(x)}{f(x)} \right\}_{deg < 4}$$

where $$g_{14}(x) = ^{14} \bmod (1+x+x^4) = 1+x^3$$

giving $$m(x) = \left\{ \frac{1+x^3}{1+x+x^4} \right\}_{deg<4} = 1 + x + x^2$$

which gives the mask vector $(m_0, m_1, m_2, m_3) = (1, 1, 1, 0)$. This indicates that all but the fourth stage of the MSRG are modulo-2 added at the PSN to give the required shift at the PSN output, as shown in FIG. 7.

The MSRG masks and corresponding PSNs for the two different initial loadings in this example are compared in FIG. 7, numeral 700. The MSRG mask formulas applied in these two situations have enabled us to produce the same shift (k=10) at the outputs of the PSNs (703 and 706), although the shifts at the outputs of the shift registers (701 and 704) are different.

The last two examples have demonstrated that, under the procedures disclosed in this invention, a specified phase shift of a PN sequence, relative to a reference sequence, can be obtained from the output of a PSN for either an SSRG or an MSRG under any nonzero initial loading of the respective LFSR.

As set forth above, the present invention discloses a method and program for determining the PN generator mask which is required to obtain a specific shift of the PN sequence at the output of a phase shift network (PSN), relative to a reference sequence, for either a simple shift register generator (SSRG) or a modular shift register generator (MSRG) under any nonzero initial loading of the respective n-stage linear feedback shift register (LFSR).

For an n-stage PN sequence generator which is implemented by using either an SSRG or an MSRG, the output for a given loading vector produces a PN sequence with a phase shift of q bits relative to the reference sequence $1/f(x)$ for each type of LFSR, where $f(x)$ is the characteristic polynomial for the sequence. The computation for the mask vector for the present invention comprises the following steps:

(a) Find the value of q, the sequence phase shift at the PN generator output.

(b) Calculate the mask vector by first determining the value of a mask parameter, denoted r and given by the equation $$\text{Mask parameter} = r = k - q + n - 1 \quad (12)$$

where the sequence at the PSN output is to be shifted by k bits from the reference sequence $1/f(x)$ using the mask, n being the number of shift register stages, and r is calculated modulo the period of the sequence, $P = 2^n - 1$.

(b1) For the SSRG type of LFSR, as diagrammed in FIG. 8 (numeral 800), using the value of r, calculate the mask vector as the coefficients $(m_0, m_1, \ldots, m_{n-1})$ of the mask polynomial $m(x) = m_0 + m_1 x + \ldots + m_{n-1} x^{n-1}$ given by $$\text{Mask polynomial} = m(x) = g_r(x) = x^r \text{ modulo } f(x) \quad (13a)$$

(b2) For the MSRG type of LFSR, as diagrammed in FIG. 9 (numeral 900), using the value of r, calculate the mask vector as the coefficients $(m_0, m_1, \ldots, m_{n-1})$ of the mask polynomial $m(x) = m_0 + m_1 x + \ldots + m_{n-1} x^{n-1}$ given by $$\text{Mask polynomial} = m(x) = \text{terms of } g_r(x)/f(x) \text{ with degree} < n \quad (13b)$$

$$= \text{terms of } [x^r \bmod f(x)]/f(x) \text{ with degree} < n$$

The method applies, for example, in a multi-cell code division multiple access (CDMA) system where the desired shift k for a given base station is a multiple of a PN code offset relative to a reference base station.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT

The present invention, as described above, can take several forms, all of which are readily comprehended by those acquainted with the art of digital electronics design and digital signal processing. The configurations for PN generators using the SSRG (201) and MSRG (301) types of LFSR, including associated mask-controlled PSNs shown respectively as 202 and 302, belong to the prior art. The present invention discloses a novel and efficient method for calculating the masks to be used in any system that requires different specific shifts of a PN sequence, relative to a reference sequence, for the same initial loading of the LFSR, that is, while preserving the sequence shift at the output of the PN generator, relative to the reference sequence.

An example application that makes use of reference and specified other shifts of a single PN sequence, derived from the same PN generator, is the forward link of the code division multiple access (CDMA) cellular telephone system described in U.S. Pat. No. 5,103,459. In that system, every base station internally maintains the same reference PN sequences for system timing purposes, but each base station uses a different offset (shift) of those reference PN code sequences, obtained with masks, for signal spreading when transmitting on the forward link. The forward link offsets are selected such that there is no ambiguity in associating multipath receptions of forward link transmissions at the mobile location with the particular base station transmitter from which they originated. Similarly, each active mobile station internally maintains the same reference PN sequences but uses different shifts of those reference sequences, obtained with masks, for signal spreading when transmitting on the reverse link. The reverse link shifts are designed to uniquely correspond to the individual mobile terminal.

Figure 1:
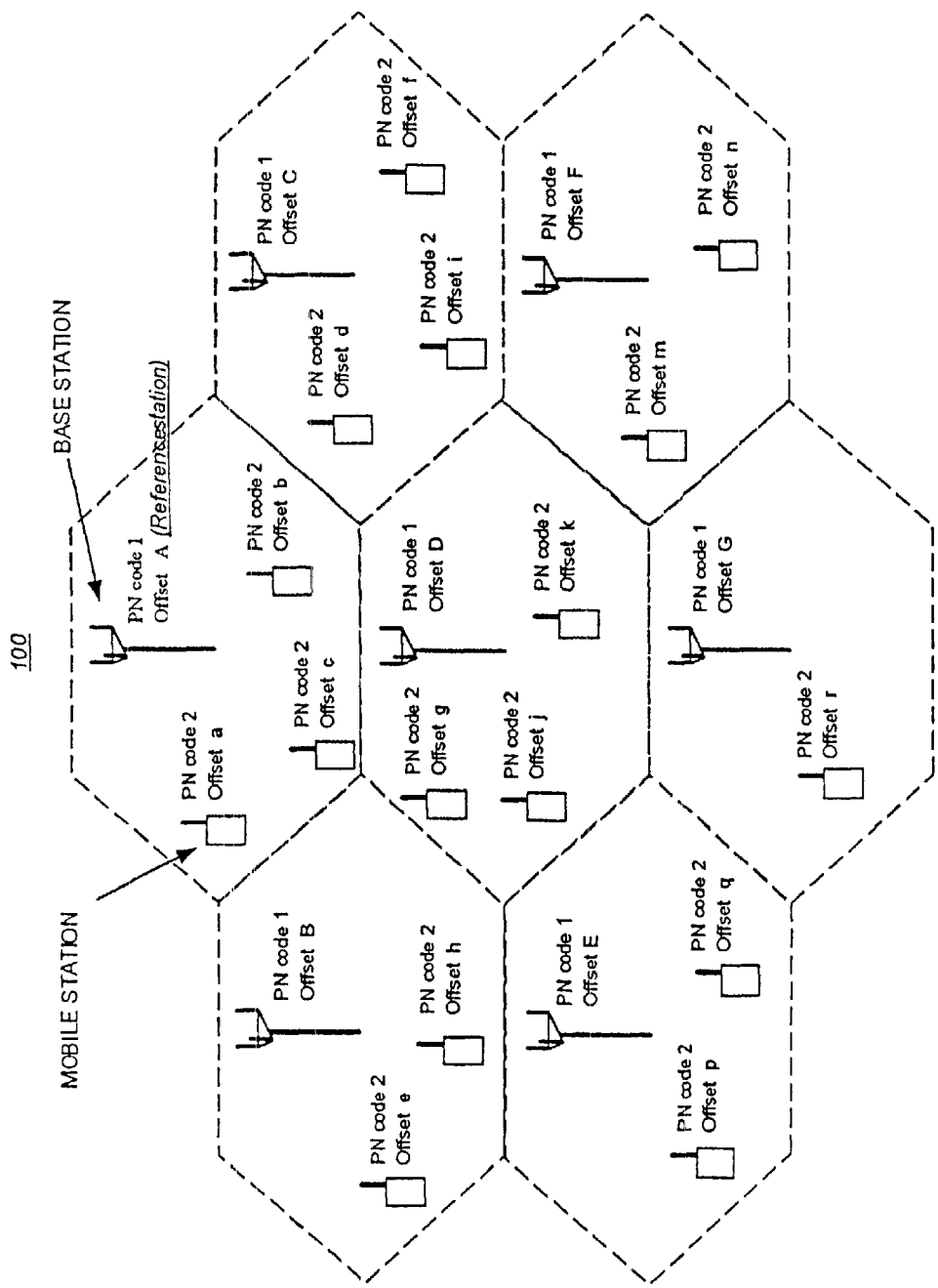
FIG. 1 illustrates the concept of a CDMA system using PN code offsets to multiplex the different transmitters in the system.
Figure 2:
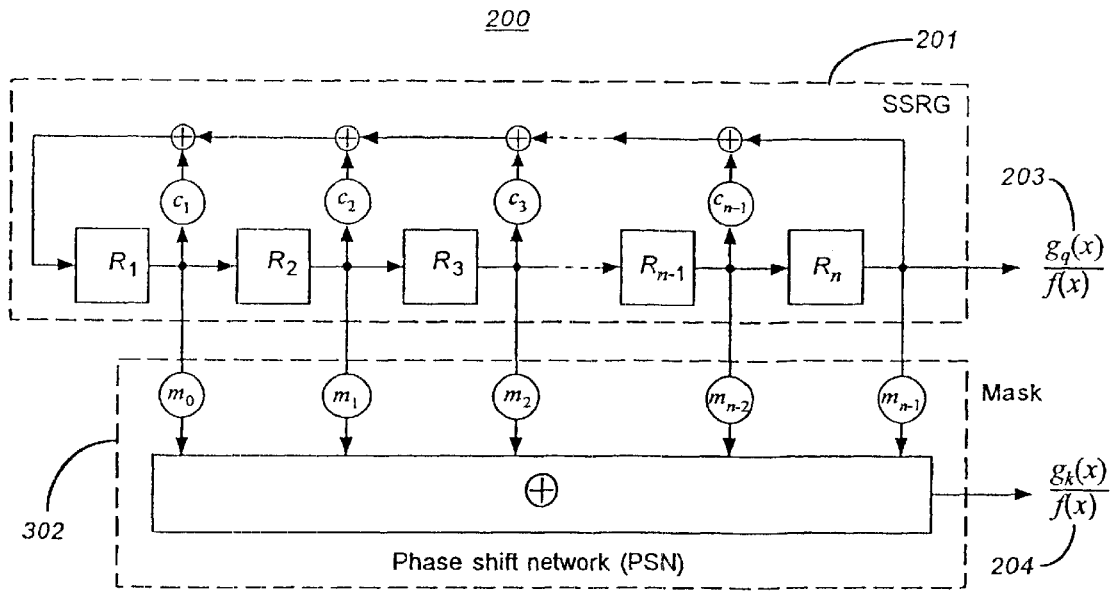
FIG. 2 is a block diagram of an SSRG-type PN generator and mask-controlled PSN.
Figure 3:
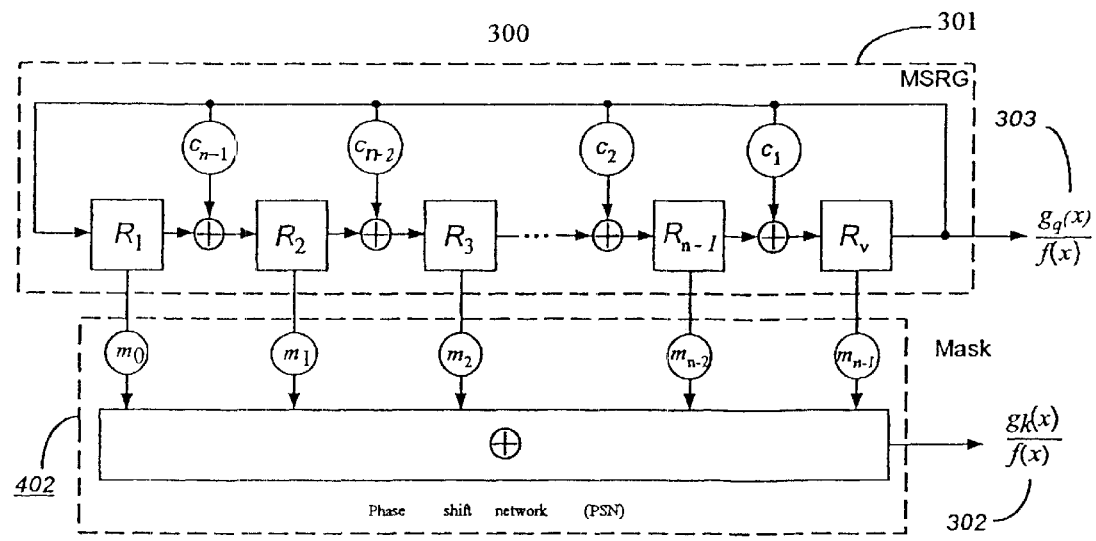
FIG. 3 is a block diagram of an MSRG-type PN generator and mask-controlled PSN.
Figure 4:
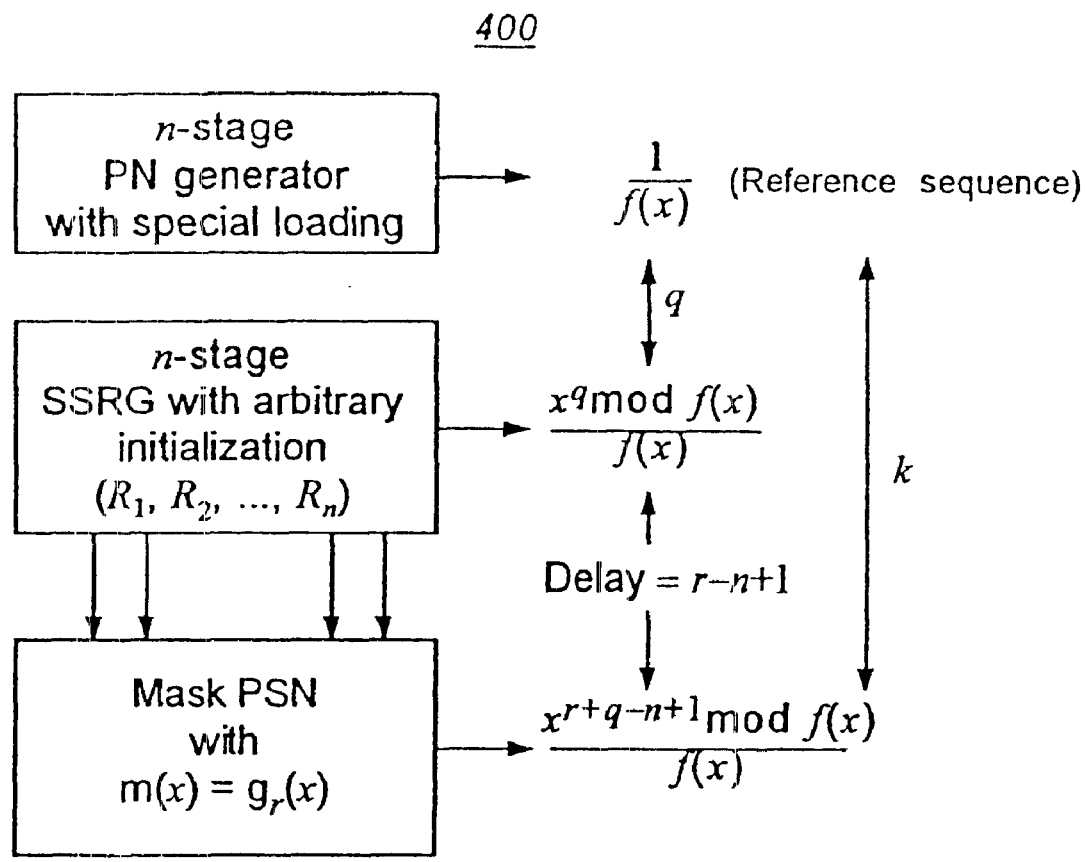
FIG. 4 is a comparison of SSRG masks for special and arbitrary loadings.
Figure 5:
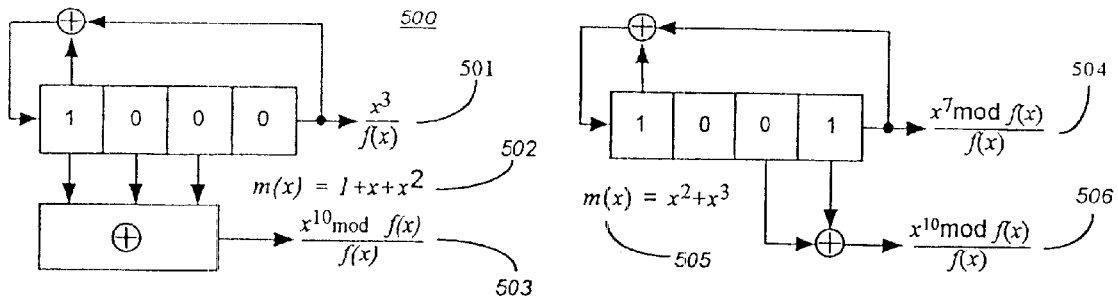
FIG. 5 compares the two cases in the SSRG mask example.
Figure 6:
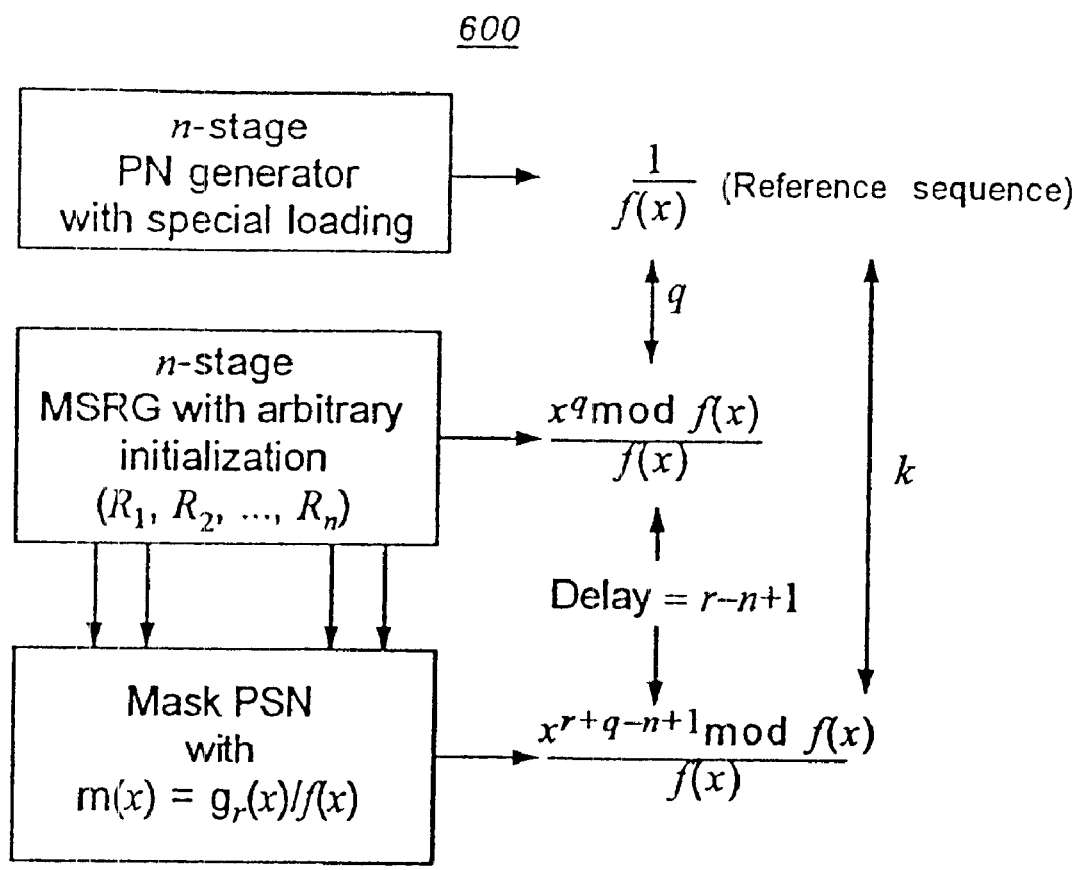
FIG. 6 is a comparison of MSRG masks for special and arbitrary loadings.
Figure 7:
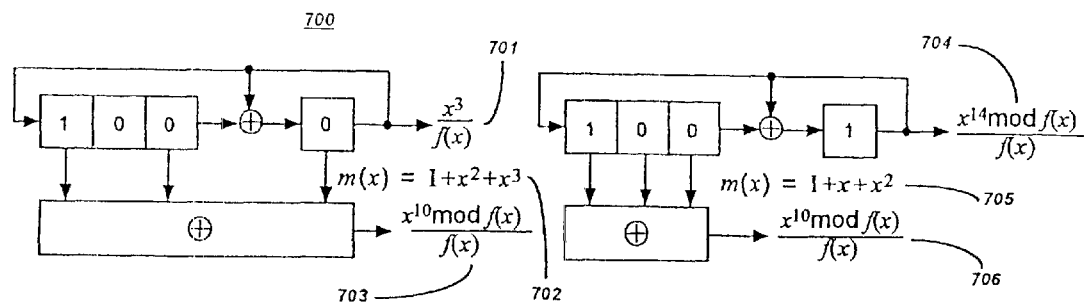
FIG. 7 compares the two cases in the MSRG mask example.
Figure 8:
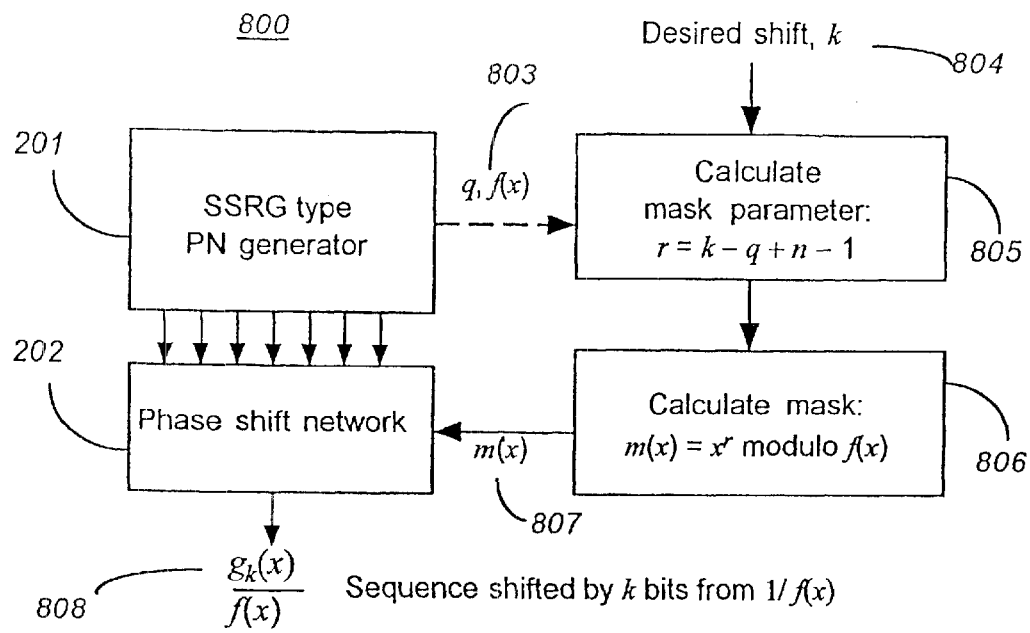
FIG. 8 is a diagram showing an embodiment of the method for an SSRG PN generator.

As illustrated in FIG. 8 (numeral 800), the method determines the shift (denoted q) of the sequence, relative to the reference sequence, at the output of the SSRG (201), from a given or chosen initial loading of the SSRG. The desired shift at the output of the PSN is denoted k. Given q and the characteristic polynomial for the sequence, f(x) (input 803), plus k (input 804), the parameter r for the mask in control of a PSN is calculated (operation 805) as r=k−q+n−1, modulo the period of the sequence, P=$2^n$−1. The mask polynomial m(x) (807) for the SSRG then is calculated (operation 806) as the numerator polynomial $$g_r(x) = x^r \text{ modulo } f(x) = g_0 + g_1 x + g_2 x^2 + \ldots + g_{n-1} x^{n-1} \qquad (14).$$

As discussed in the foregoing, the mask m(x)=$g_r(x)$ produces the desired sequence at the output of the PSN (808) for an SSRG-type PN generator.

Figure 9:
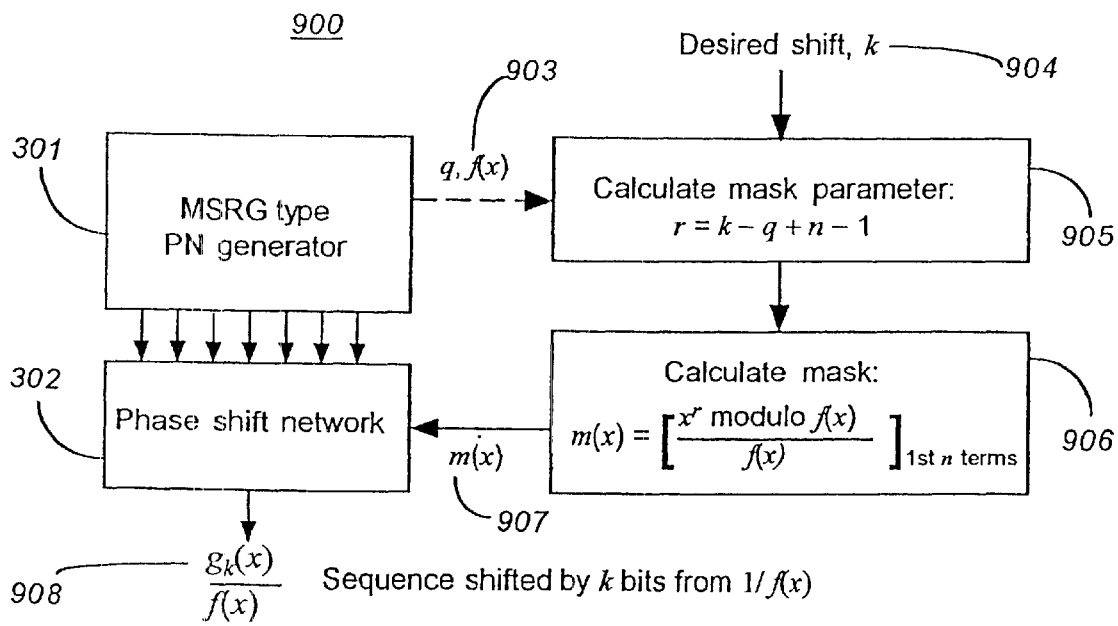
FIG. 9 is a diagram showing an embodiment of the method for an MSRG PN generator.

Similarly, as illustrated in FIG. 9 (numeral 900), the method determines the shift (denoted q) of the sequence, relative to the reference sequence, at the output of the MSRG (301), from a given or chosen initial loading of the MSRG. The desired shift at the output of the PSN is denoted k. Given q and the characteristic polynomial for the sequence, f(x) (input 903), plus k (input 904) the parameter r for the mask in control of a PSN is calculated (operation 905) as r=k−q+n−1, modulo the period of the sequence, P=$2^n$−1. The mask vector corresponding to the mask polynomial m(x) (907) for the MSRG then is calculated (operation 906) as the first n bits of the sequence represented by the ratio of the numerator polynomial in (14) and the characteristic polynomial, which is written as $$m(x) = \text{terms of } [g_r(x)/f(x)] \text{ with degree} < n \qquad (15).$$

As discussed in the foregoing, the mask calculated in this manner produces the desired sequence at the output of the PSN (908) for an MSRG-type PN generator.

The modular calculation indicated in (14) is common to operation 806 for the SSRG mask calculation and to operation 906 for the MSRG mask calculation. It can be performed using a modular shift register or it can be performed mathematically. It is quicker and more convenient to perform the calculation mathematically. Two programs for performing the modular calculation mathematically are described in what follows.

Figure 10:
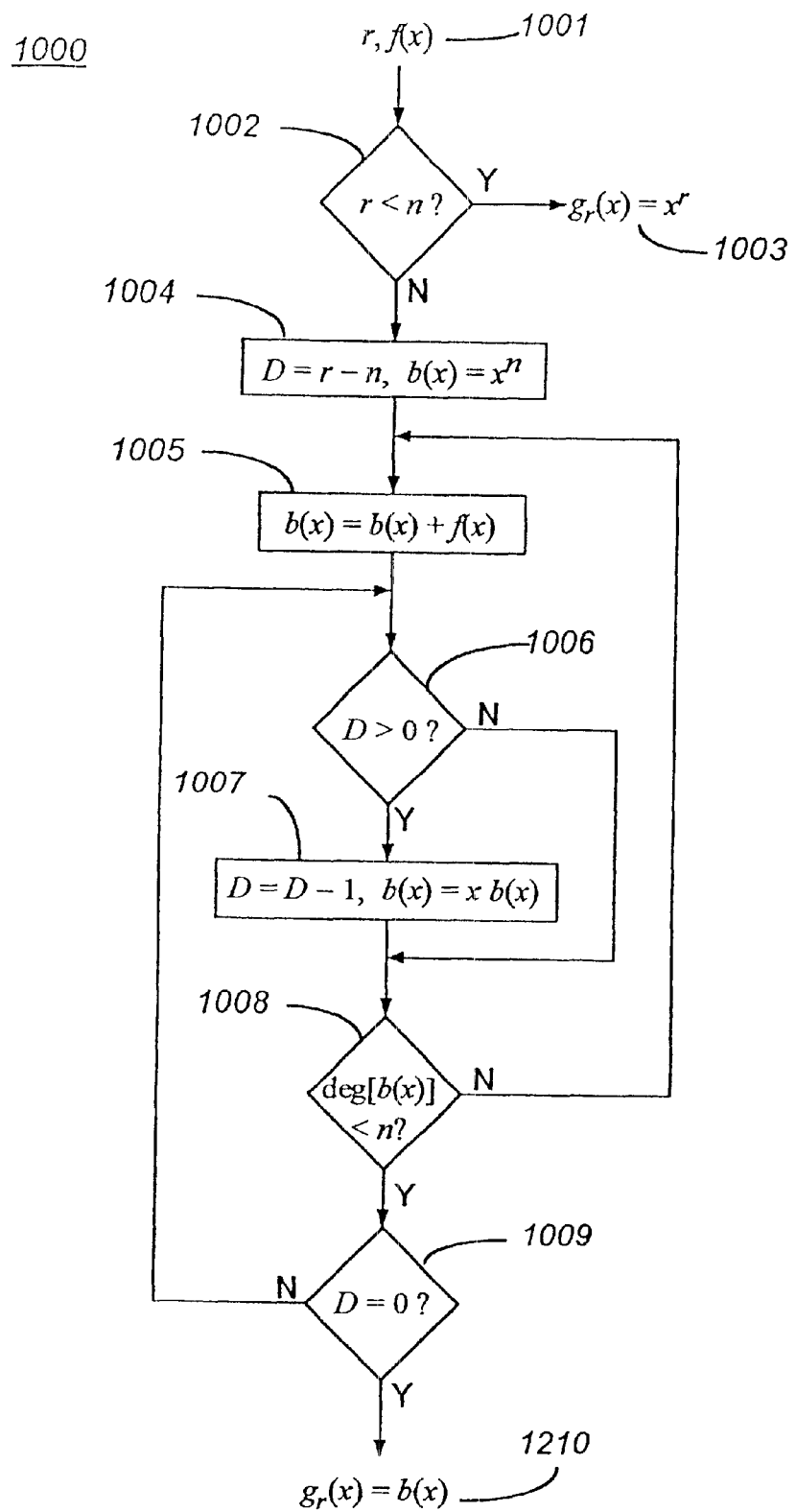
FIG. 10 is a flow diagram for modular calculations using the factoring approach.

The first program that is disclosed in this invention for the mathematical calculation of the modular remainder $g_r(x)=x^r$ modulo f(x) is based on the technique successively reducing the degree of $x^r$ by factoring until a remainder polynomial with degree less than n is found. A flow diagram for this program is given in FIG. 10 (numeral 1000). The input (1001) to the calculation consists of r and the characteristic polynomial of the sequence, f(x). The input is first tested (1002) with regard to the size of r: if r is less than n, then there is no need to do any factoring and the output (1003) of the calculation is simply $g_r(x)=x^r$. If r is greater than n, the calculation proceeds to operation 1004, in which the input is factored as $x^D b(x)$, initially with D=r−n and b(x)=$x^n$. Next, the degree of b(x), known to be n at this point, is reduced by adding f(x) modulo-2 (operation 1005). This operation is based on the fact that the modular calculation assumes that f(x)=0. From (1a), this implies that $$x^n = c_{n-1} x^{n-1} + c_{n-2} x^{n-1} + \ldots + c_2 x^2 + c_1 x + 1 \qquad (16).$$

Since the terms of the polynomial represent binary numbers, under modulo-2 binary arithmetic we have $x^n + x^n = 0$, so that adding f(x) to b(x) in operation 1005 has the effect of substituting (16) for $x^n$ in b(x), reducing its degree to the degree of the right side of (16) or less.

Next, the value of D is tested (1006): if D is positive, then further factoring is performed in operation 1007, resulting in a decrease of D by one and an increase in the degree of b(x) by one; otherwise no further factoring is performed. If at this point the degree of b(x) is less than n (test 1008) and D is zero (test 1009), then b(x) is output (1010) as the desired modular reduction of $x^r$. Otherwise, if the degree of b(x) equals n, then the flow returns to operation 1005 to reduce the degree of b(x).

For example, suppose that f(x)=$1+x^2+x^5$ and it is desired to find g(x)=$x^9$ modulo f(x)=$x^9$ modulo ($1+x^2+x^5$). Under the rules for the algebra of the modular calculation, $x^i+x^i=0$ (modulo-2 arithmetic) and f(x)=0→$x^5=1+x^2$. Thus the modular reduction of $x^9$ by the factoring technique proceeds as follows:

$$\begin{aligned}
x^9 &= (x^4)(x^5) & D &= 4, \; b(x) = x^5 \\
&= x^4(1+x^2) & b(x) &= b(x)+f(x) = 1+x^2 \\
&= x^3(x+x^3) & D &= 3, \; b(x) = xb(x) \\
&= x^2(x^2+x^4) & D &= 2, \; b(x) = xb(x) \\
&= x(x^3+x^5) & D &= 1, \; b(x) = xb(x) \\
&= x(1+x^2+x^3) & b(x) &= b(x)+f(x) = 1+x^2+x^3 \\
&= x+x^3+x^4 & D &= 0, \; b(x) = xb(x) \\
&= g_9(x)
\end{aligned}$$

For large values of n it is often more efficient to use an equation to represent the operation of a modular shift register for the modular calculation instead of the factoring technique. An MSRG, set up to implement the recursion whose characteristic polynomial is the reverse polynomial $f^*(x)=x^n f(x^{-1})$, has the property that successive states of the shift register are the binary coefficients of powers of x expressed as a polynomial modulo f(x). Thus the calculation of $x^r$ modulo f(x) is performed by raising what is commonly called the transition matrix T for such an MSRG to the power r (using modulo-2 arithmetic), and then multiplying the resulting matrix with the column vector $(u_0)^T=(0, \ldots, 0, 1)$ representing the initial state $s_0(x)=x^0=1$. That is, expressed as a column vector, the calculation of the coefficients $\{g_i\}$ of the numerator polynomial $g_r(x)$ is given by $$\begin{bmatrix} g_{n-1} \\ g_{n-2} \\ g_{n-3} \\ \vdots \\ g_1 \\ g_0 \end{bmatrix} = T^r u_0 = \begin{bmatrix} c_{n-1} & 1 & 0 & 0 & \cdots & 0 \\ c_{n-2} & 0 & 1 & 0 & \cdots & 0 \\ c_{n-3} & 0 & 0 & 1 & \cdots & 0 \\ \vdots & & & & & \vdots \\ c_1 & 0 & 0 & 0 & & 1 \\ 1 & 0 & 0 & 0 & 0 & 0 \end{bmatrix} \begin{bmatrix} 0 \\ 0 \\ 0 \\ \vdots \\ 0 \\ 1 \end{bmatrix} \quad (17a)$$

This calculation is performed very efficiently by factoring the power of the transition matrix as follows:

$$T^r = T^{r_0}(T^2)^{r_1}(T^4)^{r_2} \ldots (T^{2^{n-1}})^{r_{n-1}} \quad (17b)$$

which is based on decomposing r into its binary equivalent $$r = r_0 2^0 + r_1 2^1 + \ldots + r_{n-1} 2^{n-1}, \; r_i = 0 \text{ or } 1 \quad (17c).$$

Figure 11:
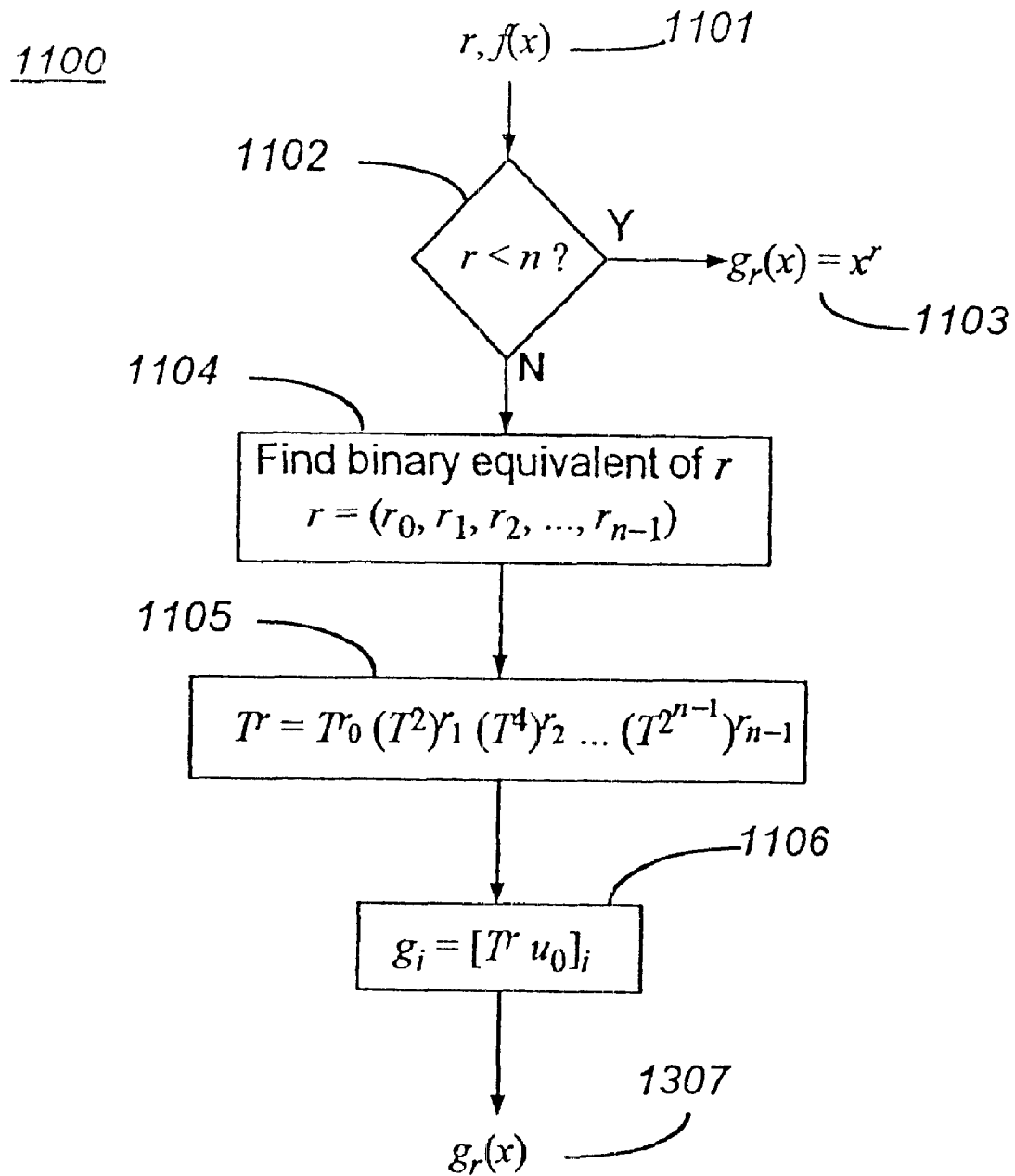
FIG. 11 is a flow diagram for modular calculations using the transition matrix approach.

A flow diagram for a program to perform the modular calculation using this transition matrix approach is given in FIG. 11, numeral 1100. The flow is the same as in FIG. 10 (numeral 1000) if r is less than n; but if r is greater than n, then the binary equivalent of r is found in operation 1104, the power of the matrix is found in operation 1105, and the coefficients of the polynomial $g_r(x)$ are found in operation 1106.

Figure 12:
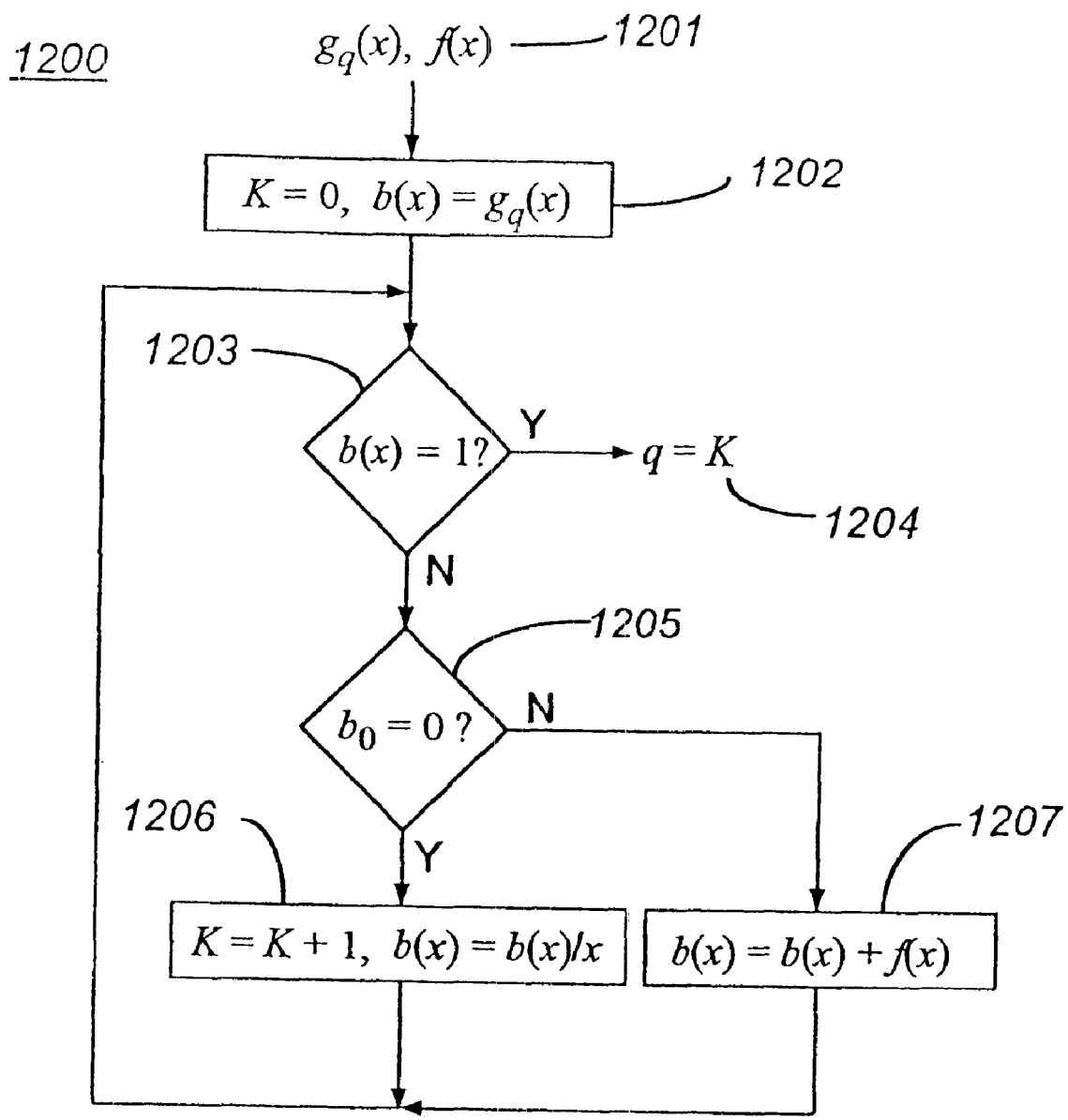
FIG. 12 is a flow diagram for reverse modular calculations.

In the case that the sequence shift at the output of the LFSR, q, is known only in the form of the numerator polynomial $g_q(x)$, the value of q can be calculated from $g_q(x)$ using the reverse modulo calculation program diagrammed in FIG. 12, numeral 1200. With $g_q(x)$ and f(x) as inputs (1201), the program starts by initializing the temporary polynomial variables K and b(x) to $x^K b(x) = g_q(x)$, with K=0 initially (operation 1202). If b(x)=1 (test 1203), the procedure exits and assigns the current value of K to the output q (1204). If $b_0$ is equal to 0 (test 1205), b(x) is factored by dividing it by x and incrementing K (operation 1206) until $b_0$ is not equal to 0. Then f(x) is added to b(x) to remove $b_0$ (operation 1207) to set up further factoring until the exit criterion is met.

For example, suppose that $f(x)=1+x^2+x^5$ and it is desired to find the value q that corresponds to $g_q(x)=x+x^3+x^4$. Under the rules for the algebra of the modular calculation, $x^i + x^i = 0$ (modulo-2 arithmetic) and $f(x)=0 \rightarrow 1 = x^2 + x^5$. Thus the program for the reverse modular calculation of $x+x^3+x^4$ proceeds as follows:

$$\begin{aligned}
x + x^3 + x^4 &= (x^0)(x + x^3 + x^4) & K &= 0, b(x) = x + x^3 + x^4 \\
&= x(1 + x^2 + x^3) & K &= 1, b(x) = b(x)/x \\
&= x(x^3 + x^5) & b(x) &= b(x) + f(x) \\
&= x^2(x^2 + x^4) & K &= 2, b(x) = b(x)/x \\
&= x^3(x + x^3) & K &= 3, b(x) = b(x)/x \\
&= x^4(1 + x^2) & K &= 4, b(x) = b(x)/x \\
&= x^4(x^5) & b(x) &= b(x) + f(x) \\
&= x^9 & q &= 9
\end{aligned}$$

If the PN generator is an SSRG, according to the method of the present invention, the numerator polynomial coefficients found in (14) or (17a) are determined to be the desired mask polynomial coefficients, as illustrated in FIG. 8, numeral 800. If the PN generator is an MSRG, the method of the present invention determines that the mask is the polynomial representing the first n bits of the sequence shift whose numerator polynomial is $g_r(x)$, as illustrated in FIG. 9, numeral 900. To implement the method for an MSRG, the polynomial $g_r(x)$ is first determined in vector form as given in equation (14) or (17a). The mask is sought as the first n bits of the LFSR sequence represented by the ratio $g_r(x)/f(x)$. Finding these first n bits is most simply done by setting $g_r(x)/f(x)=m(x)$, understanding that only terms of degree less than n are retained on the right side, then multiplying both sides by f(x) to get an equation to be solved for m(x)—that is, $g_r(x)=f(x)\,m(x)$,—understanding that only terms of degree less than n are retained. Equating the coefficients of the powers of x on both sides of this equation results in the following set of equations to be solved for the mask polynomial coefficients:

$$g_0 = m_0$$

$$g_1 = m_1 + c_1 m_0$$

$$g_2 = m_2 + c_1 m_1 + c_2 m_0$$

$$g_3 = m_3 + c_1 m_2 + c_2 m_1 + c_3 m_0$$

$$\vdots$$

$$g_{n-1} = m_{n-1} + c_1 m_{n-2} + \ldots + c_{n-2} m_1 + c_{n-1} m_0 \quad (18)$$

Figure 13:
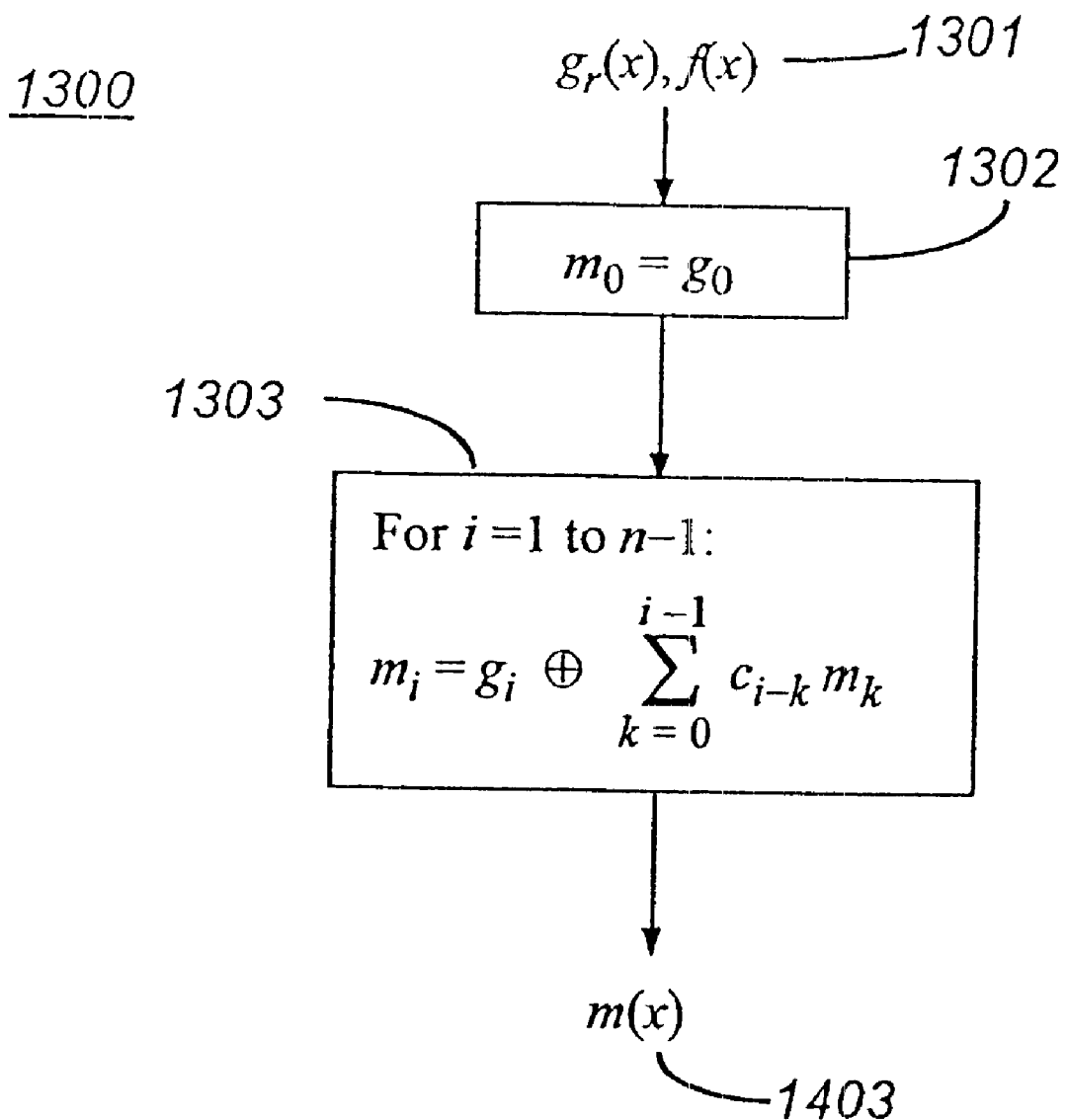
FIG. 13 is a flow diagram for calculating the MSRG mask polynomial.

The additions indicated in (18) are modulo-2 additions. The solution of the system of equations in (18) is found iteratively, as indicated in FIG. 13, numeral 1300. Given the inputs (1301) $g_r(x)$ and f(x), from the first equation in (18) the solution for $m_0$ is obviously $m_0 = g_0$, and it is determined in operation 1302. Then, substituting for $m_0$ in the second equation, it is solved for $m_1$, and so forth, as indicated in the iterated operation 1803. Together the solutions for the $\{m_i\}$ specify the mask polynomial m(x) (1304).

As an example of the cellular system mask calculation, in the CDMA cellular telephone system described in the referenced industry standard IS-95, a PN code used on the forward link for base station multiplexing is the PN code associated with the degree-15 (n=15) characteristic polynomial $$f(x) = 1 + x^2 + x^6 + x^7 + x^8 + x^{10} + x^{15}.$$

Suppose that the PN code is implemented in the system by an MSRG whose initial loading is all ones (11 . . . 11), which makes numerator polynomial for the sequence at the MSRG output $$g_q(x) = 1 + x^2 + x^3 + x^4 + x^5 + x^6 + x^7 + x^8 + x^9 + x^{10} + x^{11} + x^{12} + x^{13} + x^{14}$$

which corresponds to q=10719, as found by the reverse modular calculation in FIG. 12. The desired offset (shift) of the code sequence for any base station is a multiple of 64, that is, k=64i, to be realized using a mask-controlled PSN. The parameters of the method of the present invention are n=15, $P=2^{15}-1=32767$, q=10719, and k=64i, with i=0, 1, 2, . . . , 511. The mask parameter r for the ith base station offset is given by $$r = k - q + n - 1 = 64i - 10719 + 15 - 1 = 64i - 10705$$

where the calculation of r is done modulo P. For the example case of i=0, then, the mask parameter is r=22062. Using the factoring technique as implemented in the modular calculation of FIG. 10 (numeral 1000), the numerator polynomial is found to be $$g_r(x) = x^{22062} \bmod f(x) = x + x^2 + x^3 + x^5 + x^6 + x^9 + x^{10} + x^{11} + x^{13}$$

Using the procedure of FIG. 13 (numeral 1300) to find the terms of the polynomial division with degree less than 15, the corresponding mask polynomial is found to be $$m(x)=x^6+x^{10}+x^{11}+x^{13}+x^{14}$$

which gives the mask vector (0, 0, 0, 0, 0, 0, 1, 0, 0, 0, 1, 1, 0, 1, 1). For this specific example of a 15-stage MSRG, the PSN combines the outputs of the 7th, 11th, 12th, 14th, and 15th stages of the MSRG.

While the present invention has been described with respect to certain preferred embodiments only, other modifications and variations may be made without departing from the scope of the present invention as set forth in the following claims.

We claim:

1. A method, implemented by a processor, for determining a plurality n of mask vector components to control a phase shift by network combining the outputs of the n stages of an SSRG-type PN code generator, for any initial state of the PN generator, said method comprising the steps of:
   a) determining a value of q, which is the number of bits that the SSRG output is shifted relative to a reference sequence, $1/f(x)$, where $f(x)$ is the characteristic polynomial of the sequence, specified by a plurality of n−1 coefficients;
   b) determining the mask vector as a plurality n of the coefficients $(m_0, m_1, \ldots, m_{n-1})$ of the mask polynomial using a mathematical relationship:

mask polynomial=$m(x)=x^r$ modulo $f(x)$;

wherein r=Mask parameter=k−q+n−1, wherein n is the number of stages of the PN generator circuit, which is the desired sequence shift by which the phase shift network output is to be delayed by k bits from the reference sequence $1/f(x)$ using the mask, and the calculation is taken modulo the period of the sequence; and
   c) controlling the phase shift network, utilizing said mask, by combining a plurality of the outputs of the SSRG shift register stages to implement the desired delay.

2. A method, implemented by a processor, for determining a plurality n of mask vector components to control a phase shift network by combining the outputs of the n stages of an MSRG-type PN code generator, for any initial state of the PN generator, said method comprising the steps of:
   a) determining the value of q which is the number of bits that the MSRG output is shifted relative to the reference sequence, $1/f(x)$ wherein $f(x)$ is the characteristic polynomial of the sequence, specified by a plurality of n−1 coefficients;
   b) determining the mask vector as a plurality n of the coefficients $(m_0, m_1, \ldots, m_{n-1})$ of the mask polynomial using a mathematical relationship:

mask polynomial=$m(x)$=terms of [$x^r$ modulo $f(x)$]/$f(x)$ having degree less than n, wherein r=mask parameter=k−q+n−1, wherein n is the number of stages of the PN generator circuit, which is the desired sequence shift by which the phase shift network output is to be delayed by k bits from the reference sequence $1/f(x)$ using the mask, and the calculation is taken modulo the period of the sequence; and
   c) controlling the phase shift network, utilizing said mask, by combining a plurality of the outputs of the MSRG shift register stages to implement the desired delay.

3. A computer-readable medium for determining a mask vector to control a phase shift network by combining a plurality of the stages of an SSRG-type PN code generator, said computer-readable medium implementing the steps of:
   a) determining a mask parameter r by a mathematical relationship:

mask polynomial=$m(x)=x^r$ modulo $f(x)$;

wherein r=Mask parameter=k−q+n−1, b) constructing an n by n transition matrix, denoted by T, as follows:

$$T = \begin{bmatrix} c_{n-1} & 1 & 0 & 0 & \cdots & 0 \\ c_{n-2} & 0 & 1 & 0 & \cdots & 0 \\ c_{n-3} & 0 & 0 & 1 & \cdots & 0 \\ \vdots & & & & & \vdots \\ c_1 & 0 & 0 & 0 & & 1 \\ 1 & 0 & 0 & 0 & 0 & 0 \end{bmatrix}$$

c) calculating the coefficients $(g_0, g_1, \ldots, g_{n-1})$, utilizing said transition matrix, of the polynomial $g_r(x)=x^r$ modulo $f(x)$ by implementing the equation $$\begin{bmatrix} g_{n-1} \\ g_{n-2} \\ g_{n-3} \\ \vdots \\ g_1 \\ g_0 \end{bmatrix} = \begin{bmatrix} c_{n-1} & 1 & 0 & 0 & \cdots & 0 \\ c_{n-2} & 0 & 1 & 1 & \cdots & 0 \\ c_{n-3} & 0 & 0 & 1 & \cdots & 0 \\ \vdots & & & & & \vdots \\ c_1 & 0 & 0 & 0 & & 1 \\ 1 & 0 & 0 & 0 & 0 & 0 \end{bmatrix}^r \begin{bmatrix} 0 \\ 0 \\ 0 \\ \vdots \\ 0 \\ 1 \end{bmatrix}$$

d) equating the mask vector $(m_0, m_1, \ldots, m_{n-1})$ with the coefficients $(g_0, g_1, \ldots, g_{n-1})$ of the polynomial $g_r(x)$ from said step c.

4. A computer-readable medium for determining a mask vector to control a phase shift network by combining a plurality of the stages of an MSRG-type PN code generator, said computer-readable medium implementing the steps of:
   a) determining the mask parameter r by a mathematical relationship:

r=mask parameter=k−q+n−1, wherein n is the number of stages of the PN generator circuit, which is the desired sequence shift at the phase shift network output is to be delayed by k bits from the reference sequence $1/f(x)$ using the mask, and the calculation is taken modulo the period of the sequence;

b) constructing an n by n transition matrix, denoted T, as:

$$T = \begin{bmatrix} c_{n-1} & 1 & 0 & 0 & \cdots & 0 \\ c_{n-2} & 0 & 1 & 0 & \cdots & 0 \\ c_{n-3} & 0 & 0 & 1 & \cdots & 0 \\ \vdots & & & & & \vdots \\ c_1 & 0 & 0 & 0 & & 1 \\ 1 & 0 & 0 & 0 & 0 & 0 \end{bmatrix};$$

c) performing, utilizing said transition matrix, the modular calculation of the polynomial
$g_r(x)=x^r$ modulo $f(x)$ by implementing the equation $g=T^r s_0$, wherein the vectors $g$ and $s_0$ are as:

$$\begin{bmatrix} g_{n-1} \\ g_{n-2} \\ g_{n-3} \\ \vdots \\ g_1 \\ g_0 \end{bmatrix} = \begin{bmatrix} c_{n-1} & 1 & 0 & 0 & \cdots & 0 \\ c_{n-2} & 0 & 1 & 1 & \cdots & 0 \\ c_{n-3} & 0 & 0 & 1 & \cdots & 0 \\ \vdots & & & & & \vdots \\ c_1 & 0 & 0 & 0 & & 1 \\ 1 & 0 & 0 & 0 & 0 & 0 \end{bmatrix}^r \begin{bmatrix} 0 \\ 0 \\ 0 \\ \vdots \\ 0 \\ 1 \end{bmatrix};$$

d) equating the mask polynomial with the terms of degree less than n found by dividing the polynomial $g_r(x)$ found in step 4C by the polynomial, $f(x)$, that is, solve the following set of equations for the mask vector as the plurality of coefficients $(m_0, m_1, \ldots, m_{n-1})$ of the mask polynomial:

$g_0 = m_0$ $g_1 = m_1 + c_1 m_0$ $g_2 = m_2 + c_1 m_1 + c_2 m_0$ $g_3 = m_3 + c_1 m_2 + c_2 m_1 + c_3 m_0$ $\vdots$ $g_{n-1} = m_{n-1} + c_1 m_{n-2} + \ldots + c_{n-2} m_1 + c_{n-1} m_0$.

5. A computer-readable medium for determining a mask vector to control a phase shift network by combining a plurality of the stages of an SSRG-type PN code generator, said computer-readable medium implementing the steps of:

a) determining the mask parameter r by a mathematical relationship:

mask polynomial=$m(x)=x^r$ modulo $f(x)$;

wherein r=Mask parameter=$k-q+n-1$,;

b) performing, utilizing a factoring technique, a modular calculation of the polynomial $g_r(x)=x^r$ modulo $f(x)$, wherein the factoring technique is implemented using the sub-steps of:
  i) if r is less than n, setting $g_r(x)=x^r$;
  ii) if r is not less than n, that is, $x^r = x^d x^n$, where D is greater than or equal to zero, setting a temporary polynomial $b(x)$ equal to $x^n$;
  iii) substituting for $x^n$ the polynomial of lesser degree found from the equation $f(x)=0$;
  iv) if the degree of $x^D b(x)$ is less than n, setting $g_r(x)=x^D b(x)$; otherwise, factoring $x^D b(x)$ as $(x^{D-P})$ $(x^P b(x))$ so that the degree of the new $b(x)=x^P b(x)$ is equal to n, and proceeding to said step iii), using $D-p$ as a new value of D;

c) equating the mask vector $(m_0, m_1, \ldots, m_{n-1})$ with the coefficients of the mask polynomial given by the polynomial $g_r(x)$ found in said step b.

6. A computer-readable medium for determining a mask vector to control a phase shift network by combining a plurality of the stages of an MSRG-type PN code generator, said computer-readable medium implementing the steps of:

a) determining the mask parameter r by a mathematical relationship:

mask polynomial=$m(x)$=terms of $[x^r$ modulo $f(x)]/f(x)$ having degree less than n wherein r=mask parameter=$k-q+n-1$, wherein n is the number of stages of the PN generator circuit, which is the desired sequence shift at the phase shift network output is to be delayed by k bits from the reference sequence $1/f(x)$ using the mask, and the calculation is taken modulo the period of the sequence;

b) performing, utilizing a factoring technique, a modular calculation of the polynomial $g_r(x)=x^r$ modulo $f(x)$, wherein the factoring technique is implemented using the sub-steps of:
  i) if r is less than n, then setting $g_r(x)=x^r$;
  ii) if r is not less than n, that is, $x^r = x^D x^n$, where D is greater than or equal to zero, then setting a temporary polynomial $b(x)$ equal to $x^n$;
  iii) substituting for $x^n$ the polynomial of lesser degree found from the equation $f(x)=0$;
  iv) if the degree of $x^D b(x)$ is less than n, setting $g_r(x)=x^D b(x)$; otherwise, factoring $x^D b(x)$ as $(x^{D-P})$ $(x^P b(x))$ so that the degree of the new $b(x)=x^P b(x)$ is equal to n, and proceeding to said step iii), using $D-p$ as a new value of D;

c) equating the mask vector with the coefficients of the mask polynomial expressed as the terms of degree less than n found by dividing the polynomial $g_r(x)$ found in step 6B by the characteristic polynomial $f(x)$, that is, solving the following set of equations for the plurality of mask vector components $(m_0, m_1, \ldots, m_{n-1})$:

$g_0 = m_0$ $g_1 = m_1 + c_1 m_0$ $g_2 = m_2 + c_1 m_1 + c_2 m_0$ $g_3 = m_3 + c_1 m_2 + c_2 m_1 + c_3 m_0$ $\vdots$ $g_{n-1} = m_{n-1} + c_1 m_{n-2} + \ldots + c_{n-2} m_1 + c_{n-1} m_0$.

* * * * *